US012529394B2

(12) United States Patent
Brown

(10) Patent No.: US 12,529,394 B2
(45) Date of Patent: Jan. 20, 2026

(54) SCREW ANCHORS FOR ANCHORING LOADS

(71) Applicant: Hubbell Incorporated, Shelton, CT (US)

(72) Inventor: Adam Paul Brown, Columbia, MO (US)

(73) Assignee: Hubbell Incorporated, Shelton, CT (US)

( * ) Notice: Subject to any disclaimer, the term of this patent is extended or adjusted under 35 U.S.C. 154(b) by 310 days.

(21) Appl. No.: 16/991,450

(22) Filed: Aug. 12, 2020

(65) Prior Publication Data

US 2021/0048055 A1 Feb. 18, 2021

Related U.S. Application Data

(60) Provisional application No. 62/886,794, filed on Aug. 14, 2019.

(51) Int. Cl.
*E02D 5/80* (2006.01)
*F16B 25/00* (2006.01)

(52) U.S. Cl.
CPC .......... *F16B 25/0084* (2013.01); *E02D 5/801* (2013.01)

(58) Field of Classification Search
CPC ...... F16B 25/0084; F16B 22/103; E02D 5/56; E02D 5/72; E02D 5/80; E02D 5/801; E02D 5/54
USPC ....... 405/244, 256, 259.1, 303; 52/157, 165; 175/388, 394, 400
See application file for complete search history.

(56) References Cited

U.S. PATENT DOCUMENTS

| | | | | | |
|---|---|---|---|---|---|
| 816,857 | A | * | 4/1906 | George et al. | E02D 5/801 52/157 |
| 946,060 | A | * | 1/1910 | Looker | E21B 11/005 175/385 |
| 2,234,907 | A | * | 3/1941 | Williams | E02D 5/801 52/157 |
| 4,334,392 | A | | 6/1982 | Dziedzic | |
| 4,467,575 | A | | 8/1984 | Dziedzic | |
| RE32,076 | E | | 2/1986 | Dziedzic | |
| 4,623,025 | A | * | 11/1986 | Verstraeten | E21B 7/26 405/253 |

(Continued)

FOREIGN PATENT DOCUMENTS

JP S60148923 A * 8/1985

OTHER PUBLICATIONS

International Preliminary Report on Patentability mailed in corresponding International Application PCT/US2020/45890 mailed on Nov. 23, 2020.

(Continued)

*Primary Examiner* — Kristina R Fulton
*Assistant Examiner* — Jock Wong
(74) *Attorney, Agent, or Firm* — Wissing Miller LLP

(57) ABSTRACT

The present disclosure provides embodiments of anchors and screw anchor kits. The anchors are used to pull anchor rods used for anchoring loads to the ground. The anchors may include a wrench hub, a power point and a helical plate. The screw anchor kits may include an anchor and an anchor rod. The screw anchor kits may also include a drive wrench used to drive the anchor and anchor rod into the ground, and an eyelet that can be attached to an end of the anchor rod extending above the ground.

16 Claims, 20 Drawing Sheets

(56) References Cited

U.S. PATENT DOCUMENTS

| | | | | |
|---|---|---|---|---|
| 4,742,656 | A | 5/1988 | Farmer | |
| 4,981,000 | A | 1/1991 | Hamilton et al. | |
| 5,113,626 | A | 5/1992 | Seider et al. | |
| 5,265,982 | A * | 11/1993 | Burtelson | E02D 5/801 52/157 |
| 5,408,788 | A | 4/1995 | Hamilton et al. | |
| 5,575,122 | A * | 11/1996 | Hamilton | E02D 5/801 405/253 |
| 5,607,261 | A * | 3/1997 | Odom | E02D 5/801 52/157 |
| 9,133,595 | B2 | 9/2015 | Wilson et al. | |
| 2007/0227778 | A1 | 10/2007 | Nolan | |
| 2014/0259991 | A1 | 9/2014 | Atchley et al. | |
| 2015/0152620 | A1 | 6/2015 | Wilson et al. | |
| 2016/0333540 | A1 * | 11/2016 | Kaufman | E02D 27/48 |

OTHER PUBLICATIONS

Hubbell Power Systems, Inc, Anchoring Catalog, pp. 2-5 and 28, Mar. 2014, hubbellpowersystems.com.

Hubbell Power Systems, Inc, Chance Tough One Anchors Catalog 4, pp. 1-7, Jun. 2016, hubbellpowersystems.com.

Allied Bolt Products, LLC, Earlh Anchor Hardware Catalog. p. 1, Jun. 17, 2019, www.alliedboltinc.com International Search Report and Written Opinion mailed in Application PCT/US20/45890 on Nov. 23, 2020 (13 pages).

International Preliminary Report on Patentability mailed in PCT/US2020/045890 on Feb. 24, 2022 (8 pages).

* cited by examiner

Fig. 10
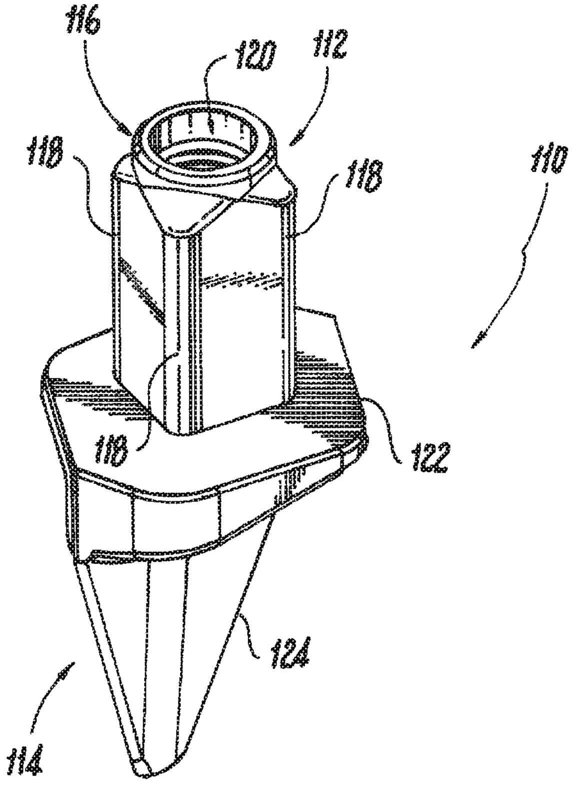
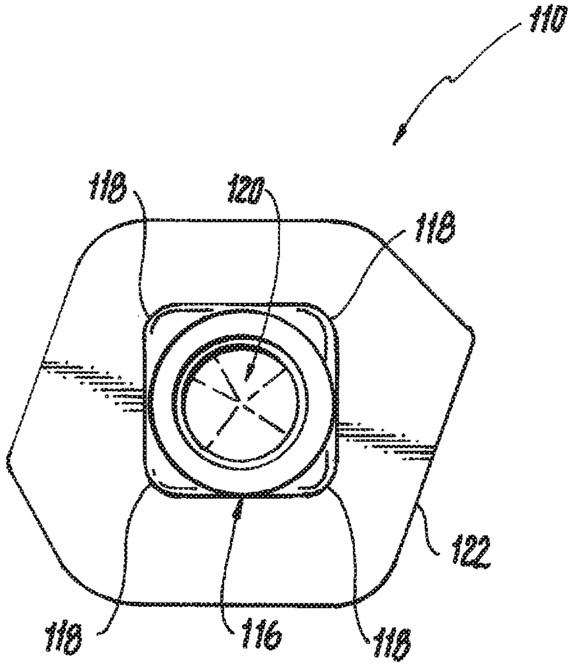
Fig. 11

SCREW ANCHORS FOR ANCHORING LOADS

CROSS-REFERENCE TO RELATED APPLICATIONS

The present disclosure is based on and claims benefit from co-pending U.S. Provisional Patent Application Ser. No. 62/886,794 filed on Aug. 14, 2019 entitled "Screw Anchors for Anchoring Loads" the contents of which are incorporated herein in their entirety by reference.

BACKGROUND

Field

The present disclosure relates generally to anchor systems and screw anchors kits used for anchoring loads. More particularly, the present disclosure relates to anchors with wrench hubs configured to contact and engage inside and outside surfaces of a drive wrench used to drive the anchors into the ground.

Description of the Related Art

Guy wires are typically used to add stability to radio transmission towers, utility poles and other free standing structures. A guy wire or guy is a tensioned cable, rope or strand that adds stability to free-standing structures. One end of the guy wire is attached to the free standing structure, which is either partially buried in the ground or otherwise anchored to the ground, and the other end of the guy wire is anchored to the ground at a distance from the free standing structure's base.

When anchoring free standing structures to the ground the angle between the vertical axis of the free standing structure and the diagonal of the guy wire is typically set at 45 degrees or greater, and the angle between the ground and the diagonal of the guy wire is also typically at 45 degrees. This configuration maintains a right triangle between the free standing structure and the ground, which provides the desired stabilizing support for the free standing structure. The tension in the diagonal of the guy wire, combined with the compressional strength of the free standing structure, allows the free standing structure to withstand lateral loads, such as wind or the weight of cantilevered structures attached to the free standing structure. Guy wires are often positioned radially about the free standing structure at equal angles, for example in trios and quads, which allows the tension of each guy wire to offset the others and stabilize the free standing structure.

A guy wire is typically attached to a ground based structure which is typically called an anchor. As is known in the art, the height of the free standing structure, the height at which the guy wire is secured to the free standing structure and the standardized 45 degree angle are factors that determine the distance the anchor needs to be positioned in the ground relative to the free standing structure. The anchor should be capable of resisting the maximum tensile load of the guy wire, including both the dead load of the tension of the guy wire and the maximum possible live load due to environmental forces, such as wind. Since the guy wire exerts its force at an angle, the anchor has both vertical and horizontal forces acting on it, and the anchor relies on the lateral shear strength of the soil to hold it in place. Several types of anchors can be used to attach guy wires to the ground, for example, dead man anchors, expanding anchors, grouted anchors, and screw anchors.

Screw anchors are a cost-effective alternative to other ground anchor types. Screw anchors typically include an anchor having a helical plate and an anchor rod. Screw anchors are preferred because of the speed and ease at which they can be installed. Generally, the anchors are rotated such that one or more load bearing helical plates at the lower end of the anchor effectively drive the anchor and anchor rod into the soil to a depth that can bear the load. In order to maintain the guy wire at the desired angle, the screw anchors used to anchor guy wires are driven or screwed into the ground at the same angle as the guy wire, i.e., at 45 degrees. The end of the anchor rod above the ground typically has an eyelet used to attach the guy wire to the anchor rod. When rotating the anchor, a drive wrench applies torque to the anchor. In some instances, the torque required to drive the anchor into the ground exceeds the maximum torque rating of the anchor. Therefore, a need exists for an anchor capable of withstanding greater torque when being driven into the ground, which ensures the anchor can meet the pile capacity requirements for anchoring a particular load.

SUMMARY

The present disclosure provides embodiments of anchors and screw anchor kits that include an anchor and an anchor rod. In one exemplary embodiment, the anchor includes a wrench hub, a power point and a load plate attached at least to the wrench hub. The load plate may be a helical plate. The wrench hub has a plurality of side walls defining a center opening, a first end and a second free end. As an example, the plurality of side walls may include four side walls shaped as a square, five side walls shaped as a pentagon, six side walls shaped as a hexagon, eight sided walls shaped as an octagon or a star shape, e.g., a Torx® type shape. The power point has a lead point portion and a nipple portion. The lead point portion has a base and a tip, and the nipple portion extends from the base in a direction away from the tip. The nipple portion includes a rod coupler that has a bore for receiving a rod anchor and at least one torque rib extending along an outer surface of the rod coupler. The at least one torque rib may include two torque ribs extending along the outer surface of the rod coupler and spaced apart about 180 degrees, of or the at least one torque rib may include four torque ribs extending along the outer surface of the rod coupler and spaced apart about 90 degrees. In this configuration, the base of the lead point portion is attached to the first end of the wrench hub.

In another exemplary embodiment, the anchor includes a wrench hub, a power point and a load plate attached at least to the wrench hub. The load plate may be a helical plate. The wrench hub has a plurality of side walls defining a center opening, a first end and a second free end. The power point has a lead point portion and a nipple portion. The lead point portion has a base and a tip. The nipple portion extends from the base in a direction away from the tip, and includes a rod coupler having a bore for receiving a rod anchor and a plurality of side walls. As an example, the plurality of wrench hub side walls may include four side walls shaped as a square, and the plurality of nipple portion side walls may include four side walls shaped as a square. In another embodiment, the wrench hub side walls may include six side walls shaped as a hexagon, and the plurality of nipple portion side walls may include six side walls shaped as a hexagon. The base of the lead point portion is attached to the first end of the wrench hub.

An exemplary embodiment of a screw anchor kit includes an anchor and an anchor rod. The anchor may be any of the anchors described above, and the anchor rod is adapted to be attached to the rod coupler of the anchor.

BRIEF DESCRIPTION OF THE DRAWINGS

The figures depict embodiments or configurations for purposes of illustration only. One skilled in the art will readily recognize from the following description that alternative embodiments or configuration of the structures illustrated herein may be employed without departing from the principles described herein, wherein:

FIG. 10 is a perspective view of another exemplary embodiment of the power point of the anchor of FIG. 9;

FIG. 11 is a top plan view of the power point of the anchor of FIG. 10, illustrating a nipple portion of the power point with four torque ribs extending from the nipple portion;

DETAILED DESCRIPTION

The present disclosure provides embodiments of anchors and screw anchor kits. The anchors according to the present disclosure are used to pull anchor rods into the ground and for anchoring loads. A non-limiting example of anchoring loads includes anchoring a guy wire. The anchors may include a wrench hub, a power point and a helical plate. The screw anchor kits according to the present disclosure may include an anchor and an anchor rod. The screw anchor kits may also include a drive wrench used to drive the anchor and anchor rod into the ground. The screw anchor kits may also include an eyelet that can be attached to an end of the anchor rod extending above the ground.

Figure 1:
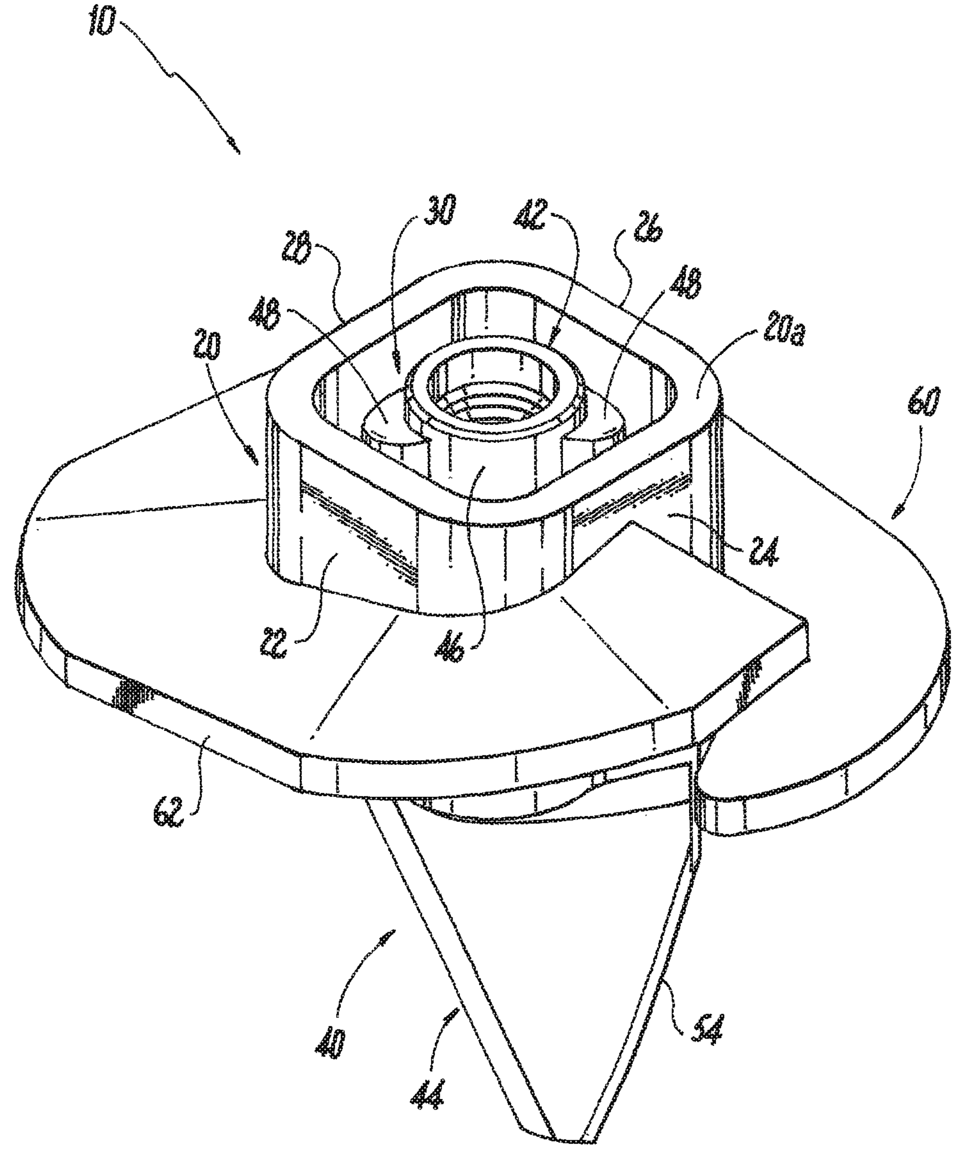
FIG. 1 is a perspective view of an exemplary embodiment of an anchor according to the present disclosure, illustrating a wrench hub, a power point attached to a distal end of the wrench hub, and a helical plate attached to the wrench hub and a portion of the power point.
Figure 2:
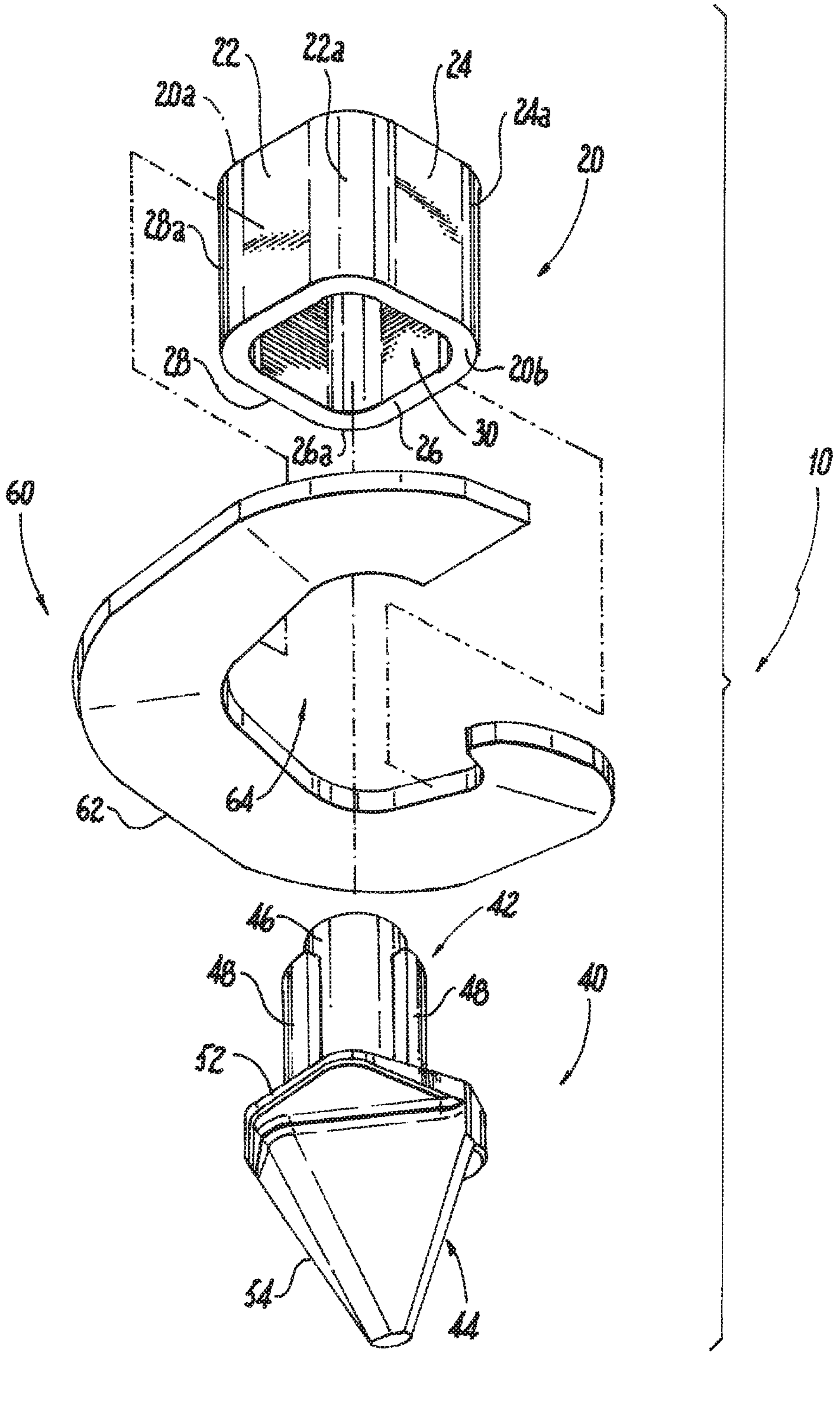
FIG. 2 is an exploded perspective view of the anchor of FIG. 1, illustrating the wrench hub, power point and the helical plate.
Figure 3:
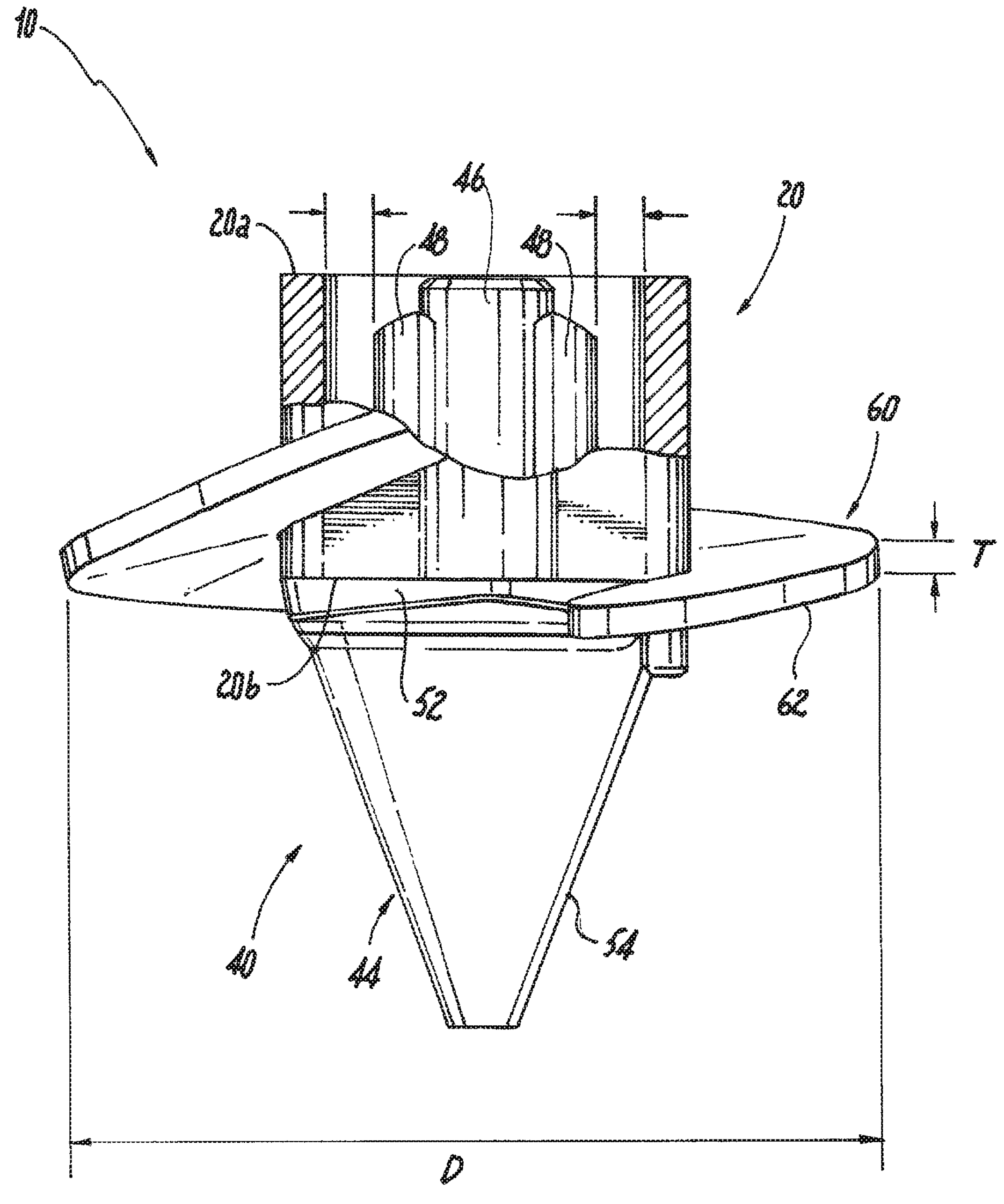
FIG. 3 is a side view of the screw anchor of FIG. 1, illustrating the wrench hub, the power point and the helical plate attached to the wrench hub and a portion of the tip.

Referring to FIGS. 1-3, an exemplary embodiment of a screw anchor according to the present disclosure is shown. In this exemplary embodiment, the anchor 10 includes a wrench hub 20, a power point 40 and a load plate 60. The wrench huh 20 is configured and dimensioned to receive a portion of the power point 40 and a drive wrench 80, seen in FIG. 5. As such, the wrench hub 20 may be in any shape and size that is sufficient to receive the portion of the power point 40 and a drive wrench, e.g., drive wrench 80. In the exemplary embodiment of FIGS. 1-3, the wrench hub 20 is a substantially square structure having four side walls 22, 24, 26 and 28 with corners 22*a*, 24*a*, 26*a* and 28*a* and a central opening 30 having an outer periphery defined by the side walls and the corners. However, the wrench hub 20 may have other shapes including, but not limited to, pentagon, hexagon and octagon shapes. For ease of description, the side walls 22, 24, 26 and 28 may also be referred to herein collectively as the "hub side walls." Similarly, for ease of description, the corners 22*a*, 24*a*, 26*a* and 28*a* may also be referred to herein collectively as the "hub corners." The hub corners may be rounded or sharp corners. The wrench hub 20 also includes a top end 20*a* and a bottom end 20*b*.

Figure 4:
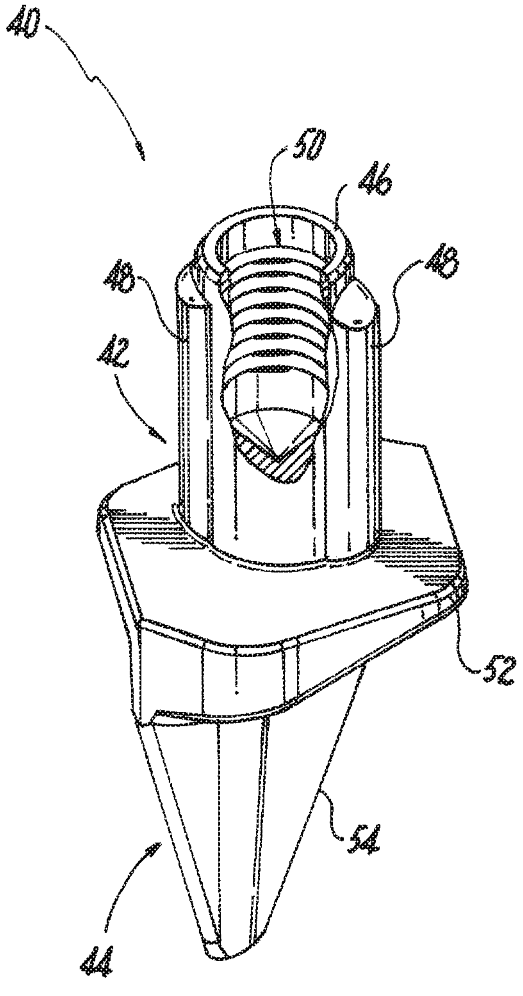
FIG. 4 is a perspective view of an exemplary embodiment of the power point of the anchor of FIG. 1.
Figure 5:
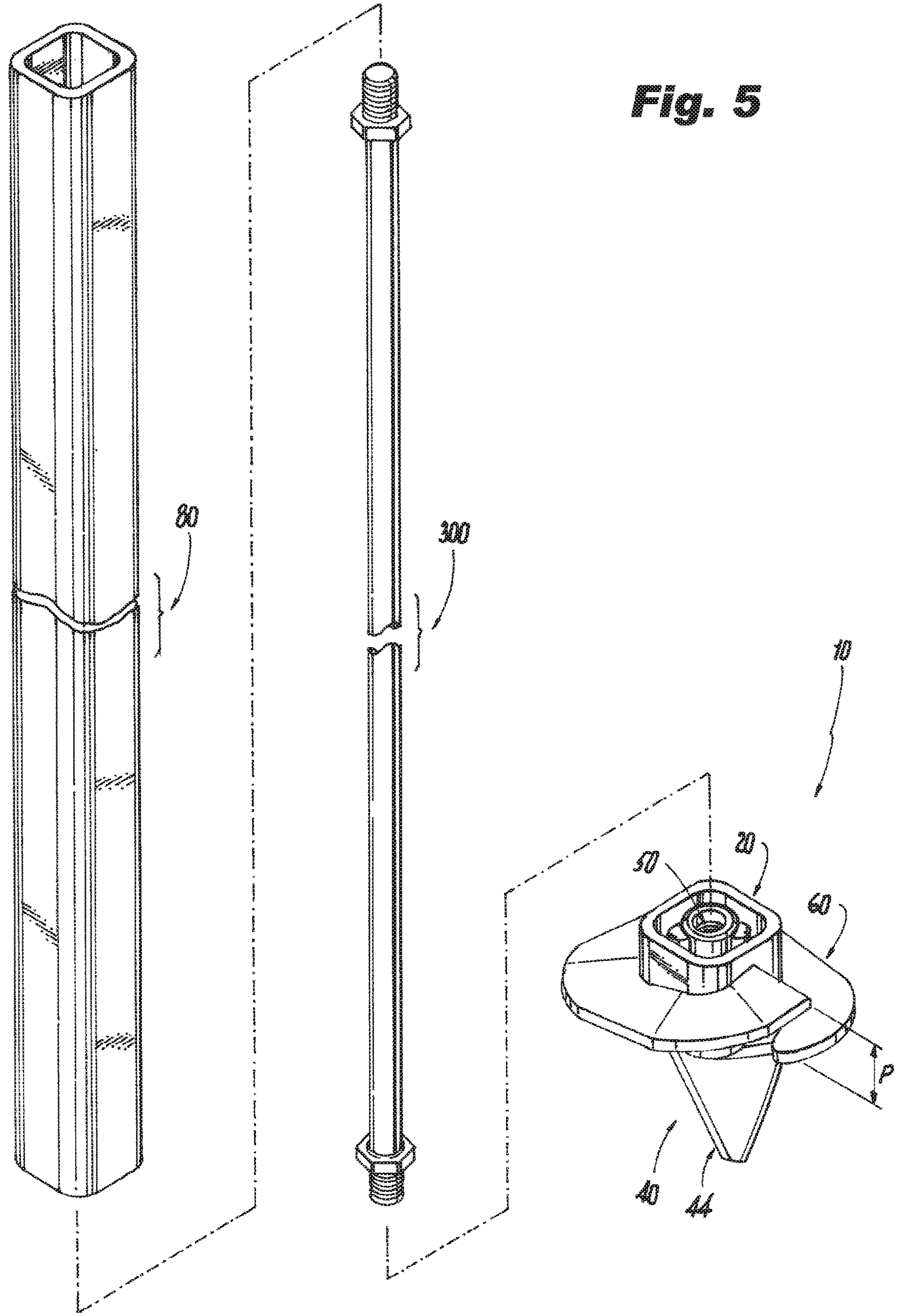
FIG. 5 is an exemplary embodiment of a screw anchor according to the present disclosure, illustrating an anchor, an anchor rod that can be attached to a nipple portion of the power point, and an optional drive wrench that can slide over the anchor rod and be inserted into the wrench hub.
Figure 6:
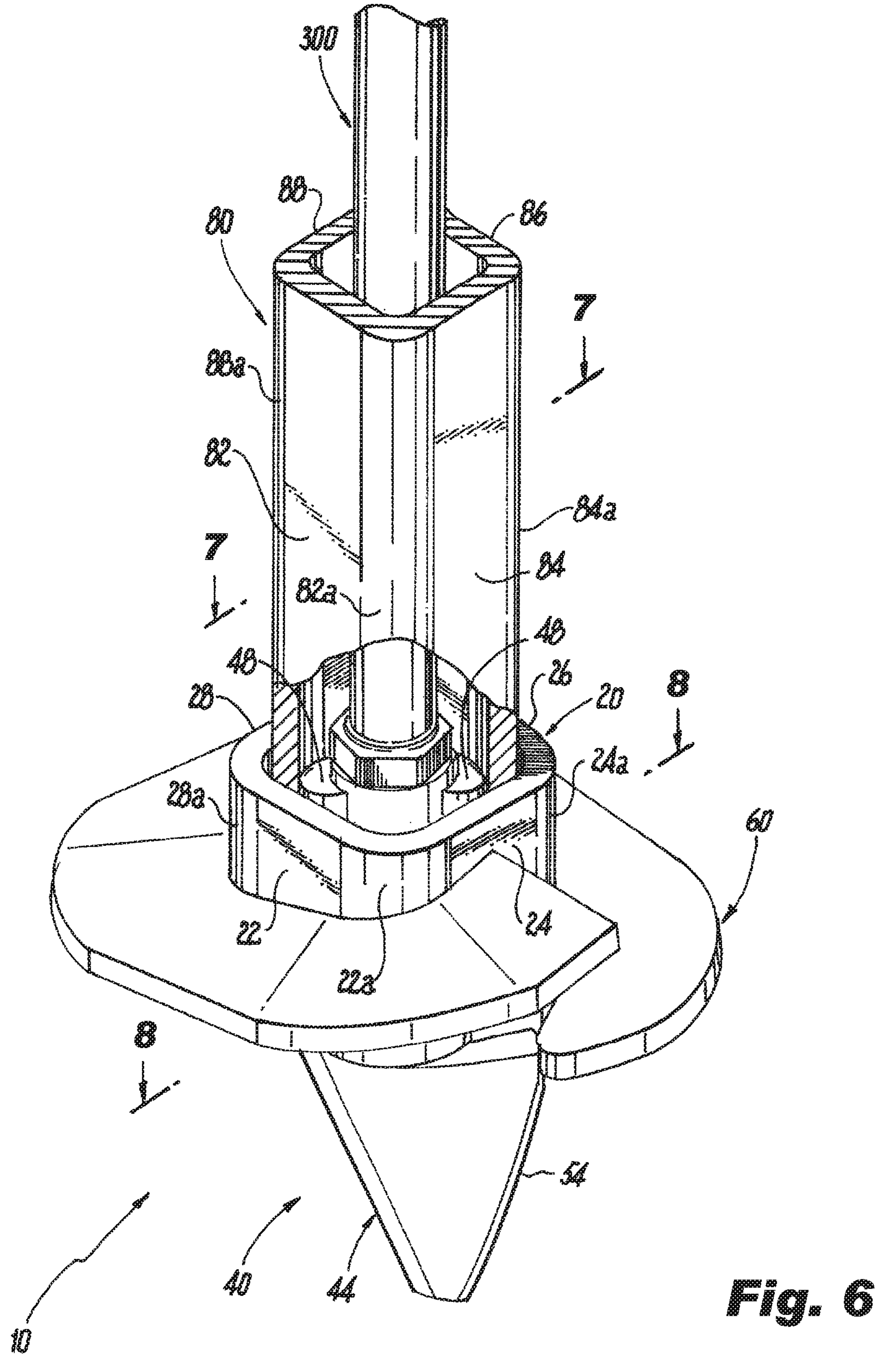
FIG. 6 is a perspective view of the anchor of FIG. 1 and a drive wrench positioned for insertion into the wrench hub of the anchor.
Figure 7:
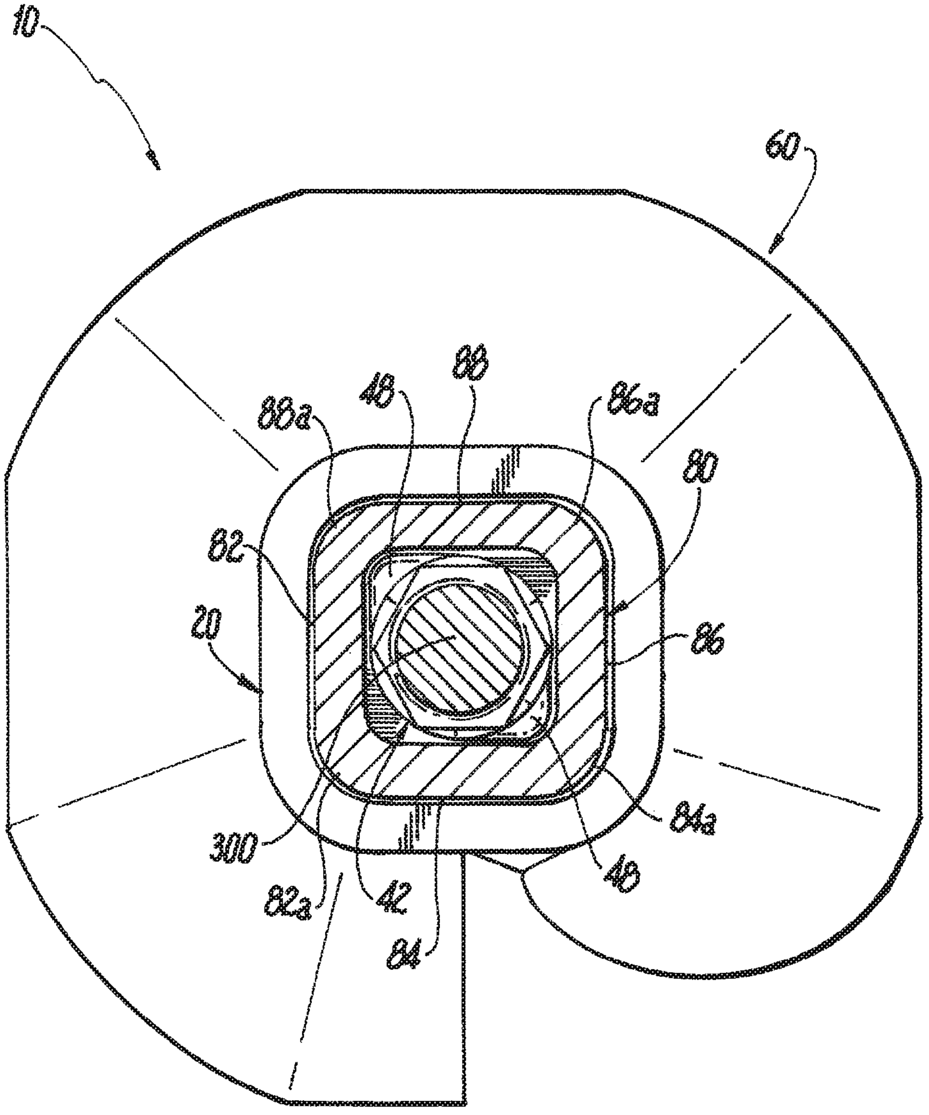
FIG. 7 is a top plan view of the anchor and drive wrench of FIG. 6, illustrating the two torque ribs engaging interior walls of the drive wrench and the outer walls of the drive wrench engaging the interior walls of the wrench hub.
Figure 8:
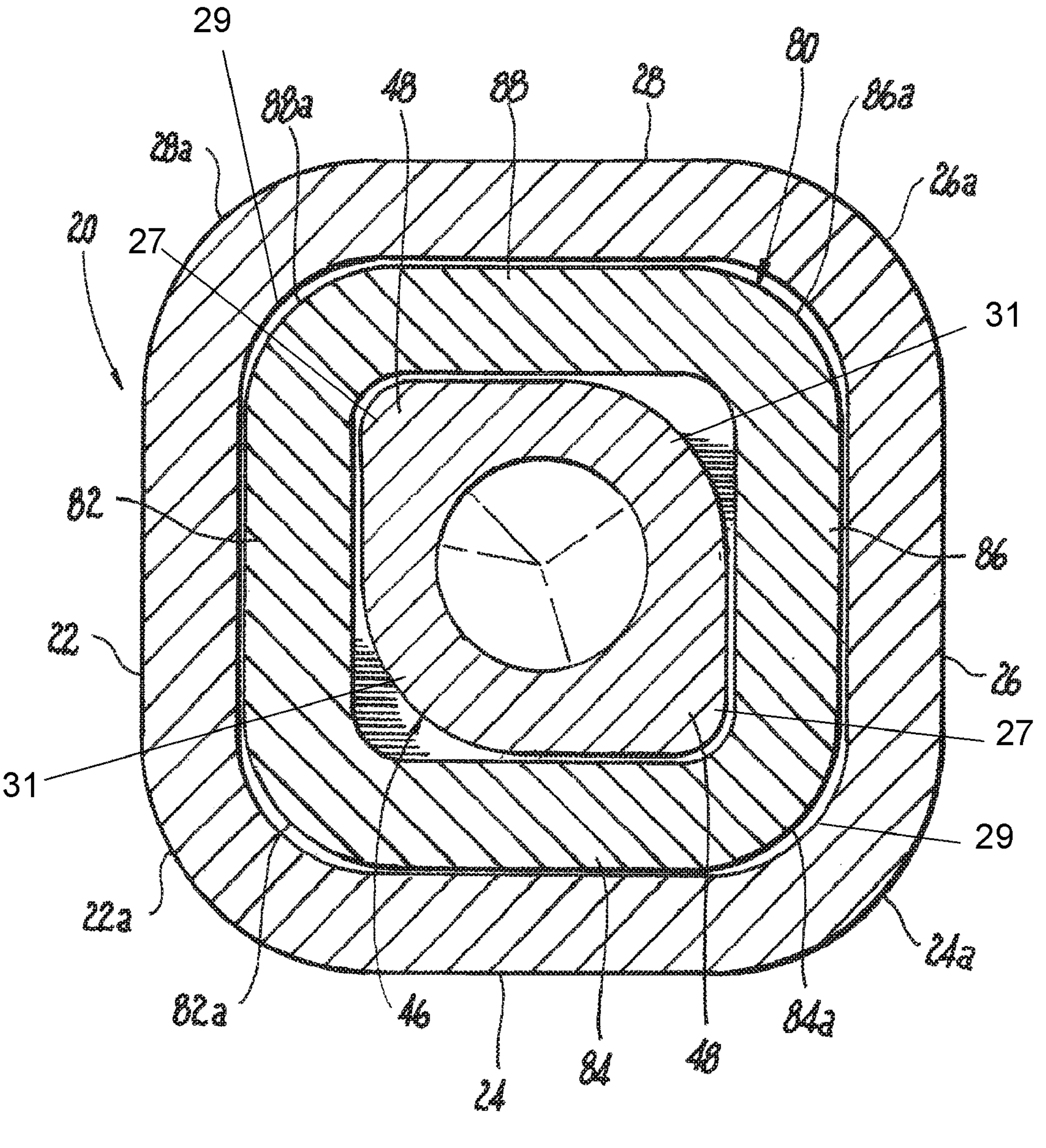
FIG. 8 is a cross-sectional view of the anchor and drive wrench of FIG. 6 taken from line 8-8, illustrating the two torque ribs of the power point engaging the interior walls of the drive wrench and the outer walls of the drive wrench engaging the interior walls of the wrench huh.
Figure 9:
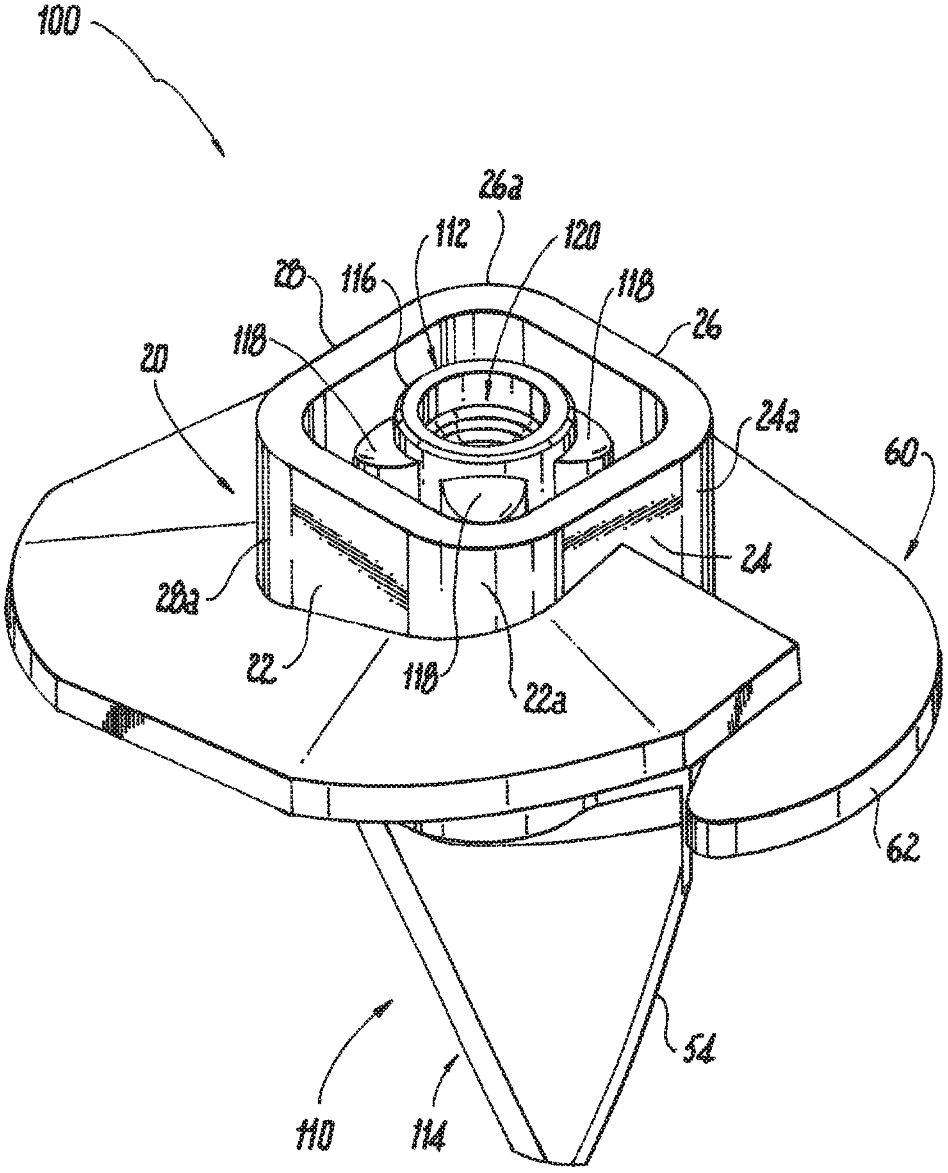
FIG. 9 is a perspective view of another exemplary embodiment of an anchor according to the present disclosure.

Referring to FIGS. 4-8, an exemplary embodiment of the power point according to the present disclosure is shown. The power point 40 includes a nipple portion 42 and a lead point portion 44. The nipple portion 42 and lead point portion 44 may be integrally joined or monolithically formed as a single member, or the nipple portion 42 and lead point portion 44 may be separate components joined together using mechanical fasteners, welds or adhesives. The nipple portion 42 includes a rod coupler 46 and one or more torque ribs 48 extending along a longitudinal axis of an outer wall of the rod coupler 46. In the embodiment shown, the rod coupler 46 is a circular member or body with a bore 50, e.g., a threaded bore, configured to receive an end, e.g., a threaded end, of an anchor rod 300, seen in FIG. 5. In the embodiment of FIG. 4, the one or more torque ribs 48 includes two torque ribs spaced about 180 degrees apart on the outer wall of the rod coupler 46. The torque ribs 48 are shaped so that when a drive wrench 80, seen in FIGS. 5 and 6, is inserted into the wrench hub 20 the torque ribs 48 can contact and engage the inside surface of the side walls 82, 84, 86 and 88 and/or the corners 82*a*, 84*a*, 86*a* and 88*a* of the drive wrench 80. For ease of description, the side walls 82, 84, 86 and 88 of the drive wrench 80 may also be referred to herein collectively as the "drive wrench walls," and the corners 82*a*, 84*a*, 86*a* and 88*a* of the drive wrench 80 may also be referred to herein collectively as the "drive wrench corners." An example of the interaction of the torque ribs 48 with the drive wrench walls and corners will be described with reference to FIGS. 7 and 8. The inside surface of the drive wrench corners are substantially rounded such that the torque ribs 48 are shaped, e.g. triangular shaped, to engage the inside surface of the rounded drive wrench corners. As depicted in FIG. 8, the inside corners 29 of the wrench hub corners (e.g., 24*a*, 28*a*) have a first radius and the outside corners 27 of the torque ribs 48 have a radius which is different (e.g., smaller) than the first radius of the wrench hub corners. The portions 31 of the rod coupler 46 between torque ribs 48 are convex as shown.

Referring to FIGS. 2-4, the lead point portion 44 of the power point 40 includes a base 52 and a tip 54. The base 52 is attached to one end, e.g., the bottom end 20*b*, of the wrench hub 20, and the tip 54 extends from the base 52 in a direction away from the nipple portion 42, as shown. The tip 54 is preferably shaped to cut through soil, small rocks and gravel within the soil. In the embodiment shown, the tip 54 is shaped as a tapered or sloped point capable of disturbing or displacing soil or obstructions in the soil so that the load plate 60 can advance through the soil more easily.

Referring again to FIGS. 2 and 3, the one or more load plates 60 are configured and dimensioned to withstand loads applied to the anchor 10 by the structure being anchored by the screw anchor. For example, if the anchor 10 is anchoring a guy wire, the one or more load plates 60 would be rated to withstand loads applied to the anchor 10 by the guy wire. In the exemplary embodiment shown, the load plate 60 is a helical plate 62 having a central opening 64. The helical plate 62 has a helical pitch "P" (e.g., see FIG. 5) that may range from, for example, between about 1 inch and about 6 inches, and is preferably about 3 inches. The thickness "T" of the helical plate 62 is, for example, between about ¼" and about ¾". The diameter "D" of the helical plate 62 may range from, for example, between about 6 inches and about 16 inches. In the exemplary embodiment shown, the load plate 60 is a single helical plate 62. However, the load plate 60 may include a continuous or spiraling helix, or the load plate 60 may include multiple helical plates 62 having the same of or different diameters. The central opening 64 of the helical plate 62 is configured and dimensioned to receive the wrench hub 20 so that the helical plate 62 wraps around the perimeter of the wrench hub 20, as shown in FIG. 3, and can be secured to the perimeter of the wrench hub 20. The helical plate 62 may also be secured to the lead point portion 44 of the power point 40.

It is noted that the components that make up the anchor 10 and anchor rod 300 can be made from, for example, steel or a galvanized steel. However, other known metals and other materials, such as Ductile iron, that have the strength to withstand the loads the anchor 10 and anchor rod 300 will need to withstand are also contemplated.

Figure 12:
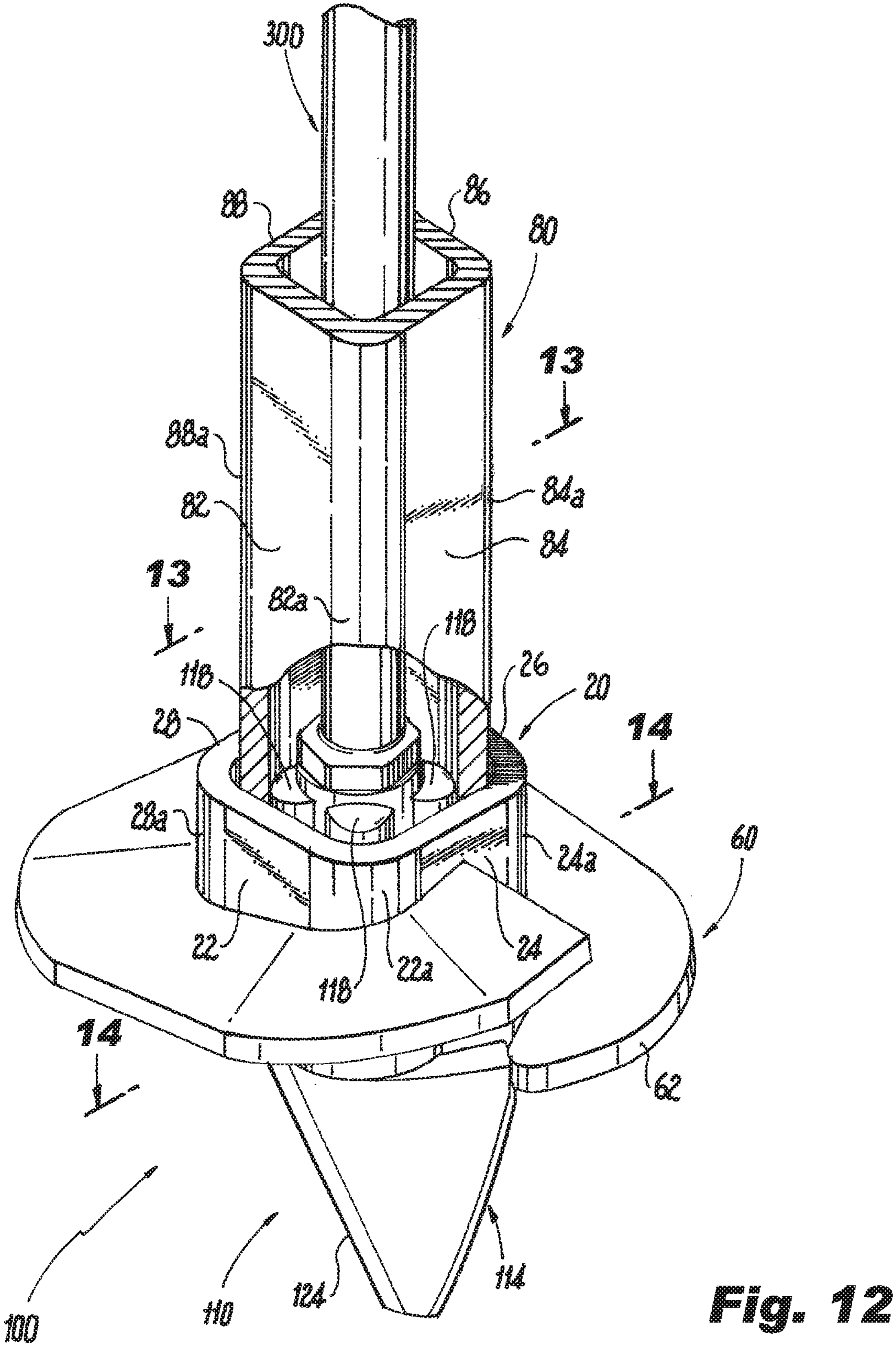
FIG. 12 is a perspective view of the anchor of FIG. 9 having a drive wrench inserted in the wrench hub of the anchor.
Figure 13:
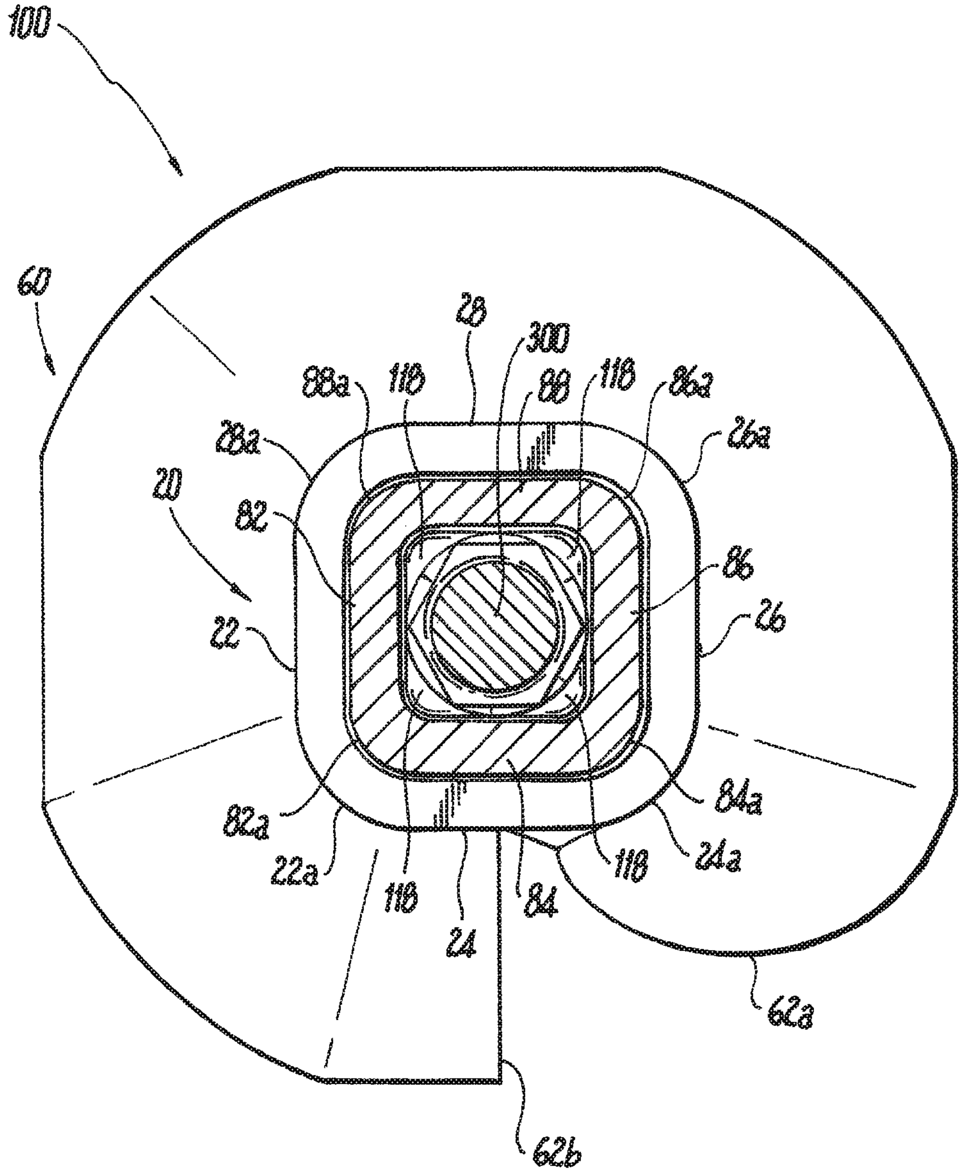
FIG. 13 is a top plan view of the anchor and drive wrench of FIG. 12 taken from line 13-13, illustrating the four torque ribs engaging interior walls of the drive wrench and the outer walls of the drive wrench engaging the interior walls of the wrench hub.
Figure 14:
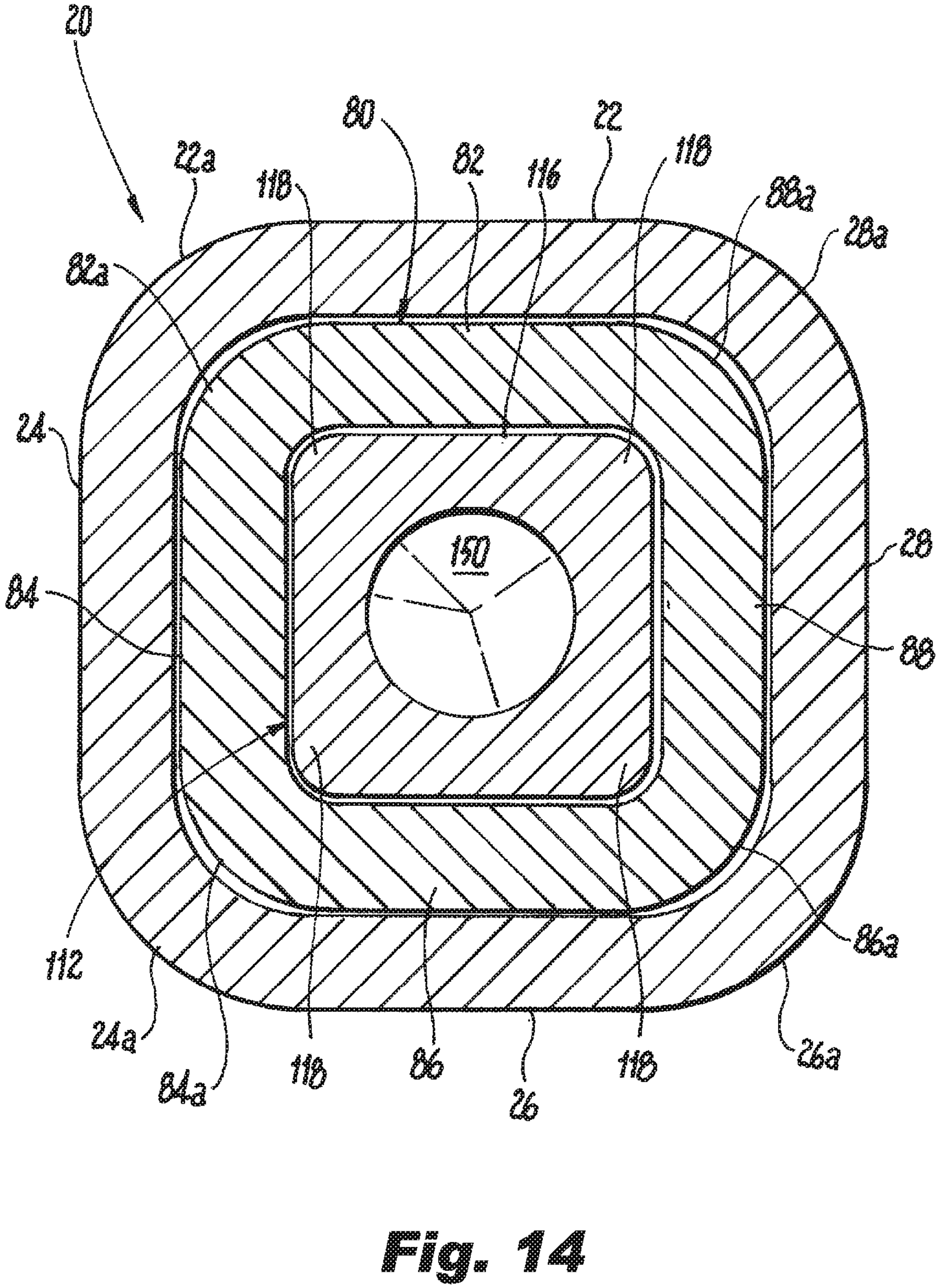
FIG. 14 is a cross-sectional view of the anchor and drive wrench of FIG. 12 taken from line 14-14, and illustrating the four torque ribs of the power point engaging the interior walls of the drive wrench and the outer walls of the drive wrench engaging the interior walls of the wrench hub.

Referring now to FIGS. 9-14, another exemplary embodiment of a screw anchor according to the present disclosure is shown. In this exemplary embodiment, the anchor 100 includes a wrench hub 20, a power point 110 and one or more load plates 60. Load plate 60 has a leading edge 62*a* and a trailing edge 62*b*. The wrench hub 20 and load plate 60 are the same as the wrench hub and load plate described above and for ease of description are not repeated. In this exemplary embodiment, the power point 110 includes a nipple portion 112 and a lead point portion 114. The nipple portion 112 and lead point portion 114 may be integrally joined or monolithically formed as a single member, or the nipple portion 112 and lead point portion 114 may be separate components joined together using mechanical fasteners, welds or adhesives. The nipple portion 112 includes a rod coupler 116 and one or more torque ribs 118 extending from an outer wall of the rod coupler 116. In the embodiment shown, the rod coupler 116 is a circular member or body with a bore 120, e.g., a threaded bore, seen in FIG. 10, configured to receive an end, e.g., a threaded end, of an anchor rod 300, seen in FIG. 5. In the embodiment of FIGS. 10 and 11, the one or more torque ribs 118 includes four torque ribs spaced about 90 degrees apart on the outer wall of the rod coupler 116. The torque ribs 118 are shaped so that when a drive wrench 80, seen in FIGS. 5 and 6, is inserted into the wrench hub 20 the torque ribs 118 can contact and engage the inside surfaces of the drive wrench corners and/or the inside surfaces of the drive wrench walls. As shown in FIGS. 12-14, the inside surfaces of the drive wrench corners are substantially rounded so that the four torque ribs 118 are shaped, e.g., triangularly shaped, to engage the inside surfaces of the rounded drive wrench corners. It is noted that the torque ribs 118 extending from the rod coupler 116 may form a square shape that is substantially similar to the square of the wrench hub 20 and the drive wrench 80.

Referring to FIG. 10, the lead point portion 114 of the power point 110 includes a base 122 and a tip 124. The base 122 is attached to one end, e.g., the bottom end 20*b*, of the wrench hub 20, and the tip 124 extends from the base 122 in a direction away from the nipple portion 112. The tip 124 is preferably shaped to cut through soil, small rocks and gravel within the soil. In the embodiment shown, the tip 124 is shaped as a tapered or sloped point capable of disturbing or displacing soil or obstructions in the soil so that the load plate 60 can advance through the soil more easily.

It is noted that the components that make up the anchor 100 can be made from, for example, steel or a galvanized steel. However, other known metals and other materials, such as Ductile iron, that have the strength to withstand the loads the anchor 10 will need to withstand are also contemplated.

Referring to FIGS. 15-18, another exemplary embodiment of an anchor according to the present disclosure is shown. It is noted that for ease of illustration and description this exemplary embodiment is shown and described without the anchor rod 300 secured to the rod coupler 116. In this exemplary embodiment, the anchor 200 includes a wrench hub 220, a power point 240 and a load plate 60. The load plate 60 is the same as the load plate described above and for ease of description is not repeated.

Figure 15:
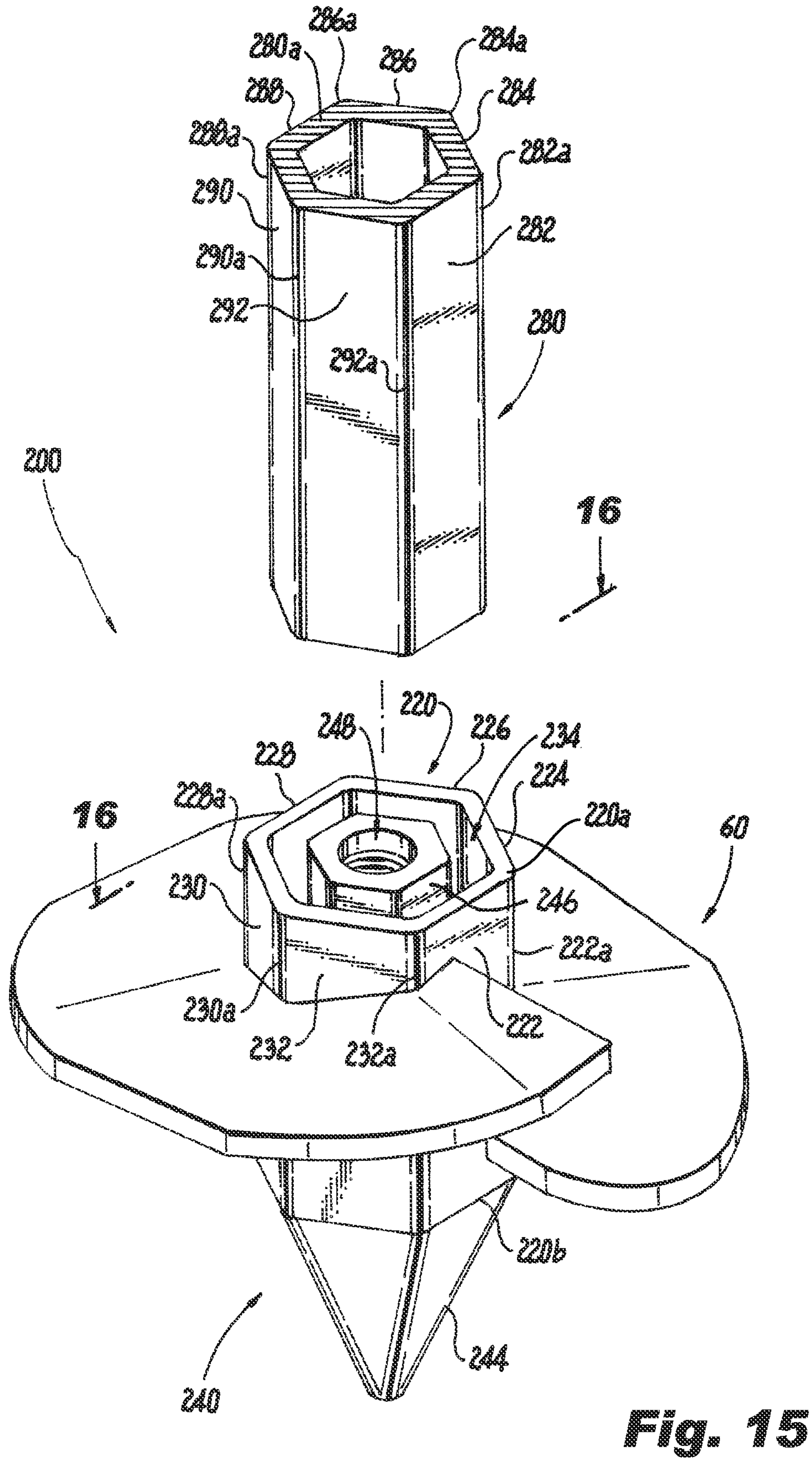
FIG. 15 is a perspective view of another exemplary embodiment of an anchor according to the present disclosure, illustrating a multi-sided wrench hub, a power point and a helical plate where a nipple portion of the wrench hub has a multi-sided shape, and illustrating a drive wrench that has a similar multi-sided shape as the wrench hub and the nipple portion.
Figure 16:
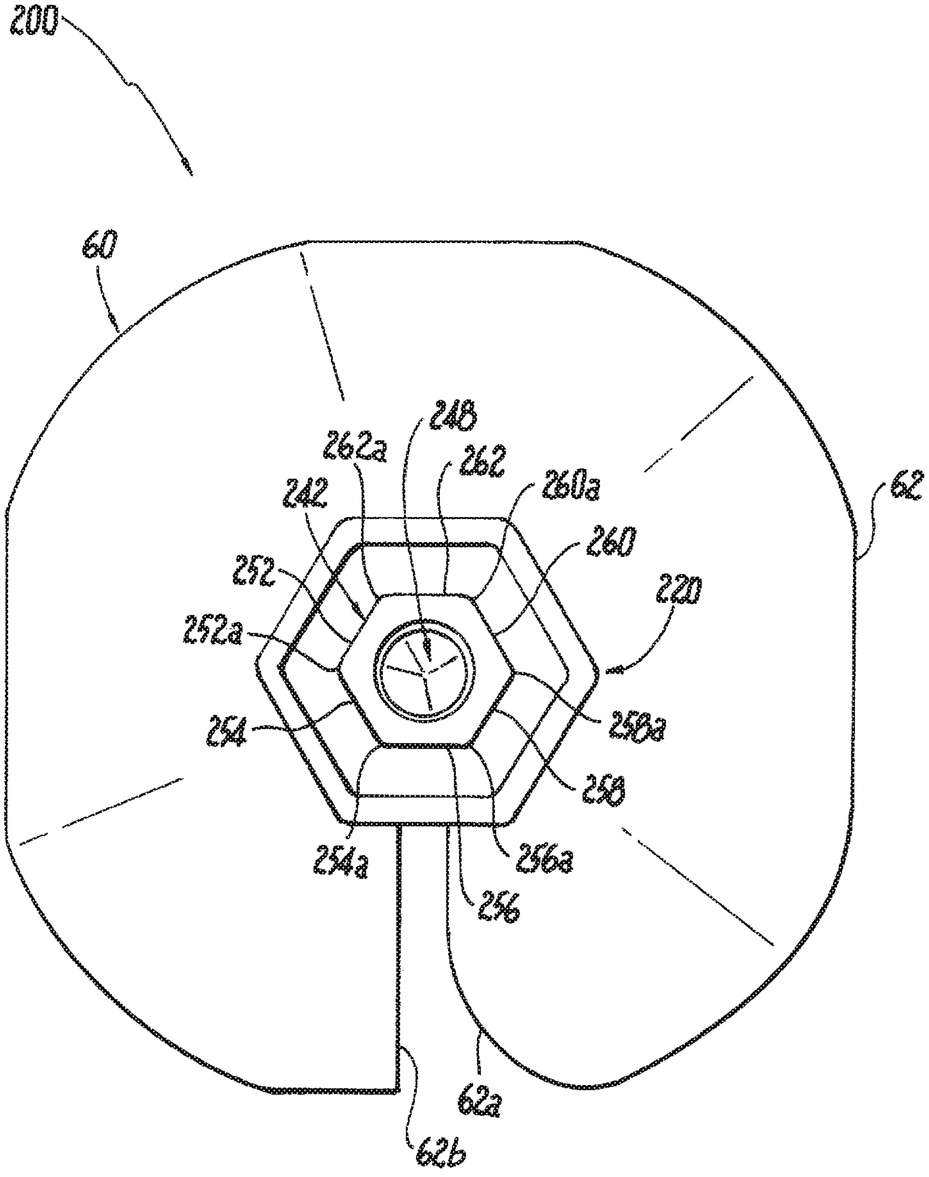
FIG. 16 is a top plan view of the anchor and drive wrench of FIG. 15 taken from line 16-16, illustrating the side walls of the multi-sided nipple portion engaging interior side walls of the multi-sided drive wrench, and illustrating the outer side walls of the multi-sided drive wrench engaging the interior side walls of the multi-sided wrench hub.
Figure 17:
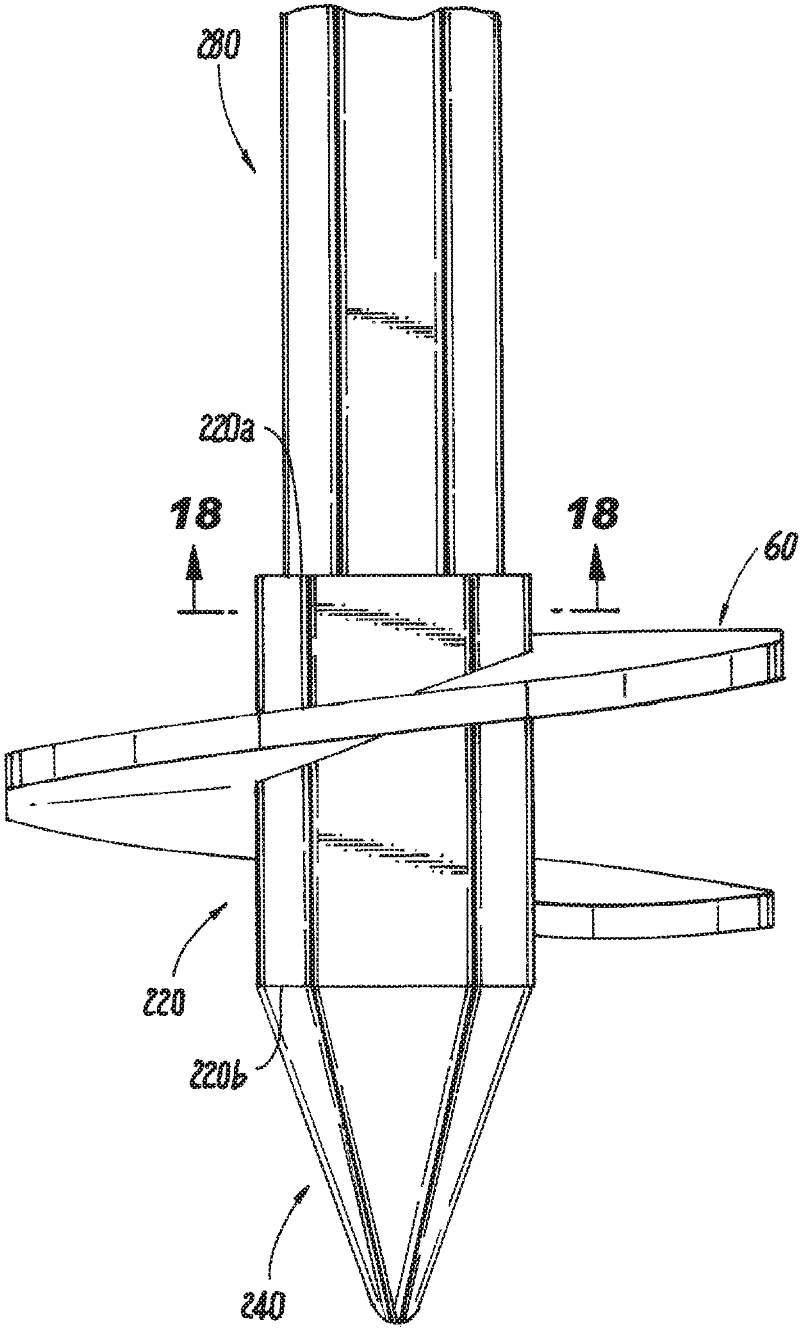
FIG. 17 is a side elevation view of the anchor and drive wrench of FIG. 15.
Figure 18:
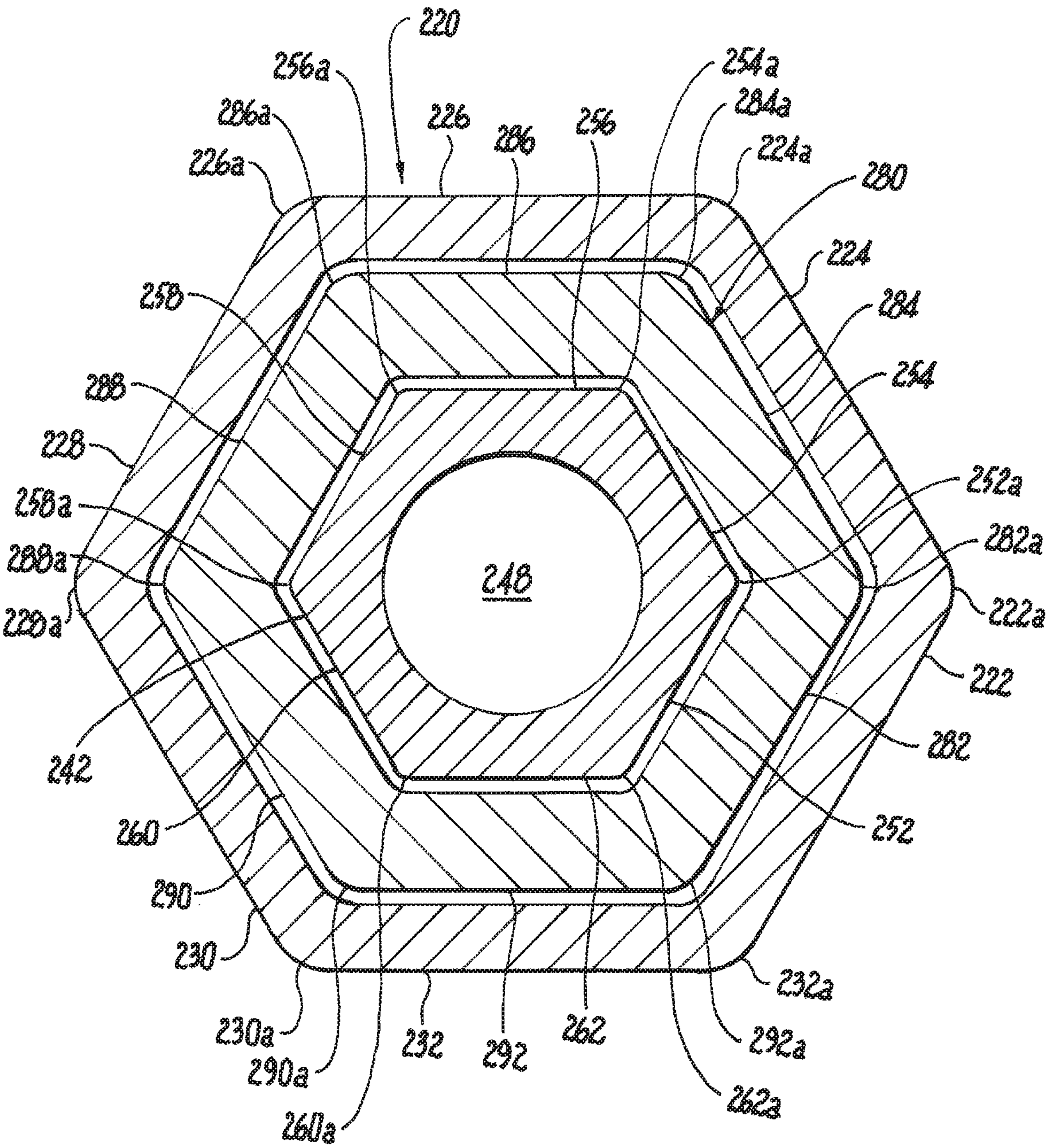
FIG. 18 is a cross-sectional view of the anchor and drive wrench of FIG. 17 taken from line 18-18, and illustrating the side walls of the multi-sided nipple portion engaging the interior side walls of the multi-sided drive wrench, and illustrating the outer side walls of the drive wrench engaging the interior side walls of the wrench hub.

The wrench hub 220 is configured and dimensioned to receive a portion of the power point 240 and a drive wrench 280. As such, the wrench hub 220 may be in any shape and size sufficient to receive the portion of the power point 240 and a drive wrench 280. As shown in FIGS. 15-18, the wrench hub 220 is a substantially hexagon structure having six side walls 222, 224, 226, 228, 230 and 232 with corners **222*a*, 224*a*, 226*a*, 228*a*, 230*a* and 232*a* and a central opening 234 having an outer periphery defined by the side walls and the corners. However, the wrench hub 220 may have other shapes, including pentagon and octagon shapes. For ease of description, the side walls 222, 224, 226, 228, 230 and 232 may also be referred to herein collectively as the hub side walls. Similarly, for ease of description, the corners 222*a*, 224*a*, 226*a*, 228*a*, 230*a* and 232*a* may also be referred to herein collectively as the hub corners. The hub corners may be rounded or sharp corners. The wrench hub 220 also has a top end 220*a* and a bottom end 220*b*. In the embodiment where the wrench hub 220 is a substantially hexagon structure, the drive wrench 280 may also be a substantially hexagon structure, as shown in FIG. 15, so that the drive wrench 280 can fit within the central opening 234 in the wrench hub 220, as shown in FIG. 18. In such a configuration, the drive wrench 280 would have a top end 280*a*, six drive wrench walls, e.g., side walls 282, 284, 286, 288, 290 and 292, and six corresponding drive wrench corners 282*a*, 284*a*, 286*a*, 288*a*, 290*a* and 292*a***.

Continuing to refer to FIGS. 15-18, another exemplary embodiment of the power point according to the present disclosure is shown. The power point 240 includes a nipple portion 242, seen in FIG. 16, and a lead point portion 244, seen in FIG. 15. The nipple portion 242 and lead point portion 244 may be integrally joined or monolithically formed as a single member, or the nipple portion 242 and lead point portion 244 may be separate components joined together using mechanical fasteners, welds or adhesives. The nipple portion 242 includes a rod coupler 246 that has central bore 248 configured to receive an end, e.g., a threaded end, of an anchor rod, e.g., the anchor rod 300 seen in FIG. 5. The rod coupler 246 is configured and dimensioned to permit the inside walls of the drive wrench 280 to pass over the rod coupler 246 and engage the inside walls of the drive wrench 280 as seen in FIG. 18. In this exemplary embodiment, the rod coupler 246 has a hexagon shape that conforms to the hexagon shape of the wrench hub 220 and the drive wrench 280. However, the rod coupler 246 may have other shapes, including pentagon and octagon shapes. The rod coupler 246 includes side walls 252, 254, 256, 258, 260 and 262 with corners **252*a*, 254*a*, 256*a*, 258*a*, 260*a* and 262*a*. For ease of description, the side walls 252, 254, 256, 258, 260 and 262 may also be referred to herein collectively as the "coupler walls." Similarly, for ease of description, the corners 252*a*, 254*a*, 256*a*, 258*a*, 260*a* and 262*a* may also be referred to herein collectively as the "coupler corners." When the drive wrench 280, seen in FIGS. 15 and 18, is inserted into the wrench hub 220**, the outside surfaces of the coupler walls and/or the coupler corners can contact and engage the respective inside surfaces of the drive wrench walls and/or drive wrench corners.

In this exemplary embodiment, the lead point portion 244 of the power point 240 is a pointed body that is attached to one end, e.g., the bottom end **220*b*, of the wrench hub 220. The lead point portion 244** is a tip shaped to cut through soil, small rocks and gravel within the soil.

It is noted that the components that make up the anchor 200 can be made from; for example, steel or a galvanized steel. However, other known metals and other materials, such as Ductile iron, that have the strength to withstand the loads the anchor 200 will need to withstand are also contemplated.

Figure 19:
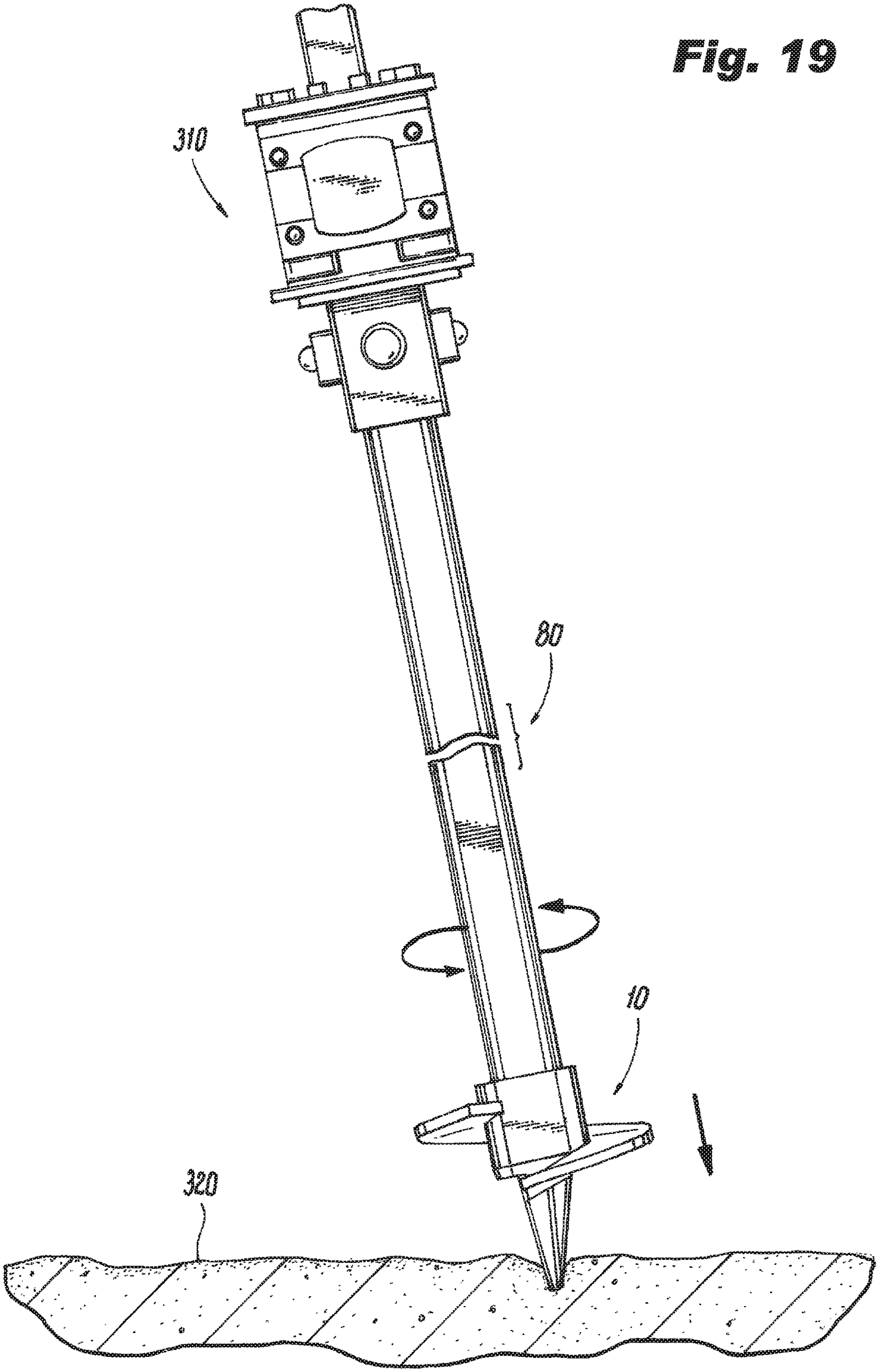
FIG. 19 is a side elevation view of exemplary initial steps of a method for installing the anchor and anchor rod of FIG. 5 into the ground, illustrating a pile drive system attached to one end of the drive wrench and the other end of the drive wrench inserted into the wrench hub with the lead point portion of the power point in contact with the ground ready for insertion into the ground.
Figure 20:
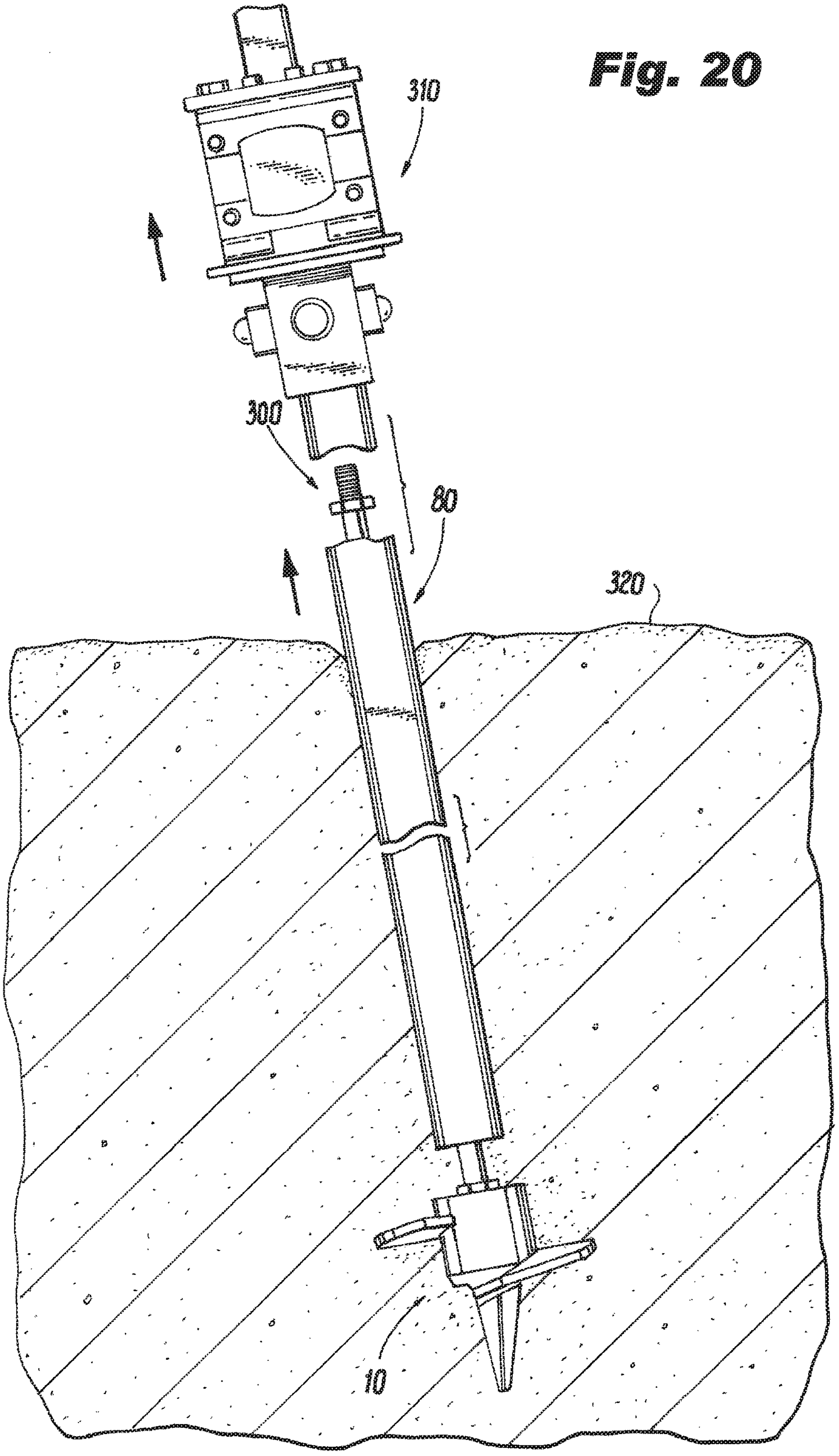
FIG. 20 is a side elevation view of exemplary intermediate steps of the method for installing the anchor and anchor rod of FIG. 5 into the ground, illustrating the anchor, anchor rod and drive wrench inserted into the ground, and illustrating the drive wrench being removed from the wrench hub.
Figure 21:
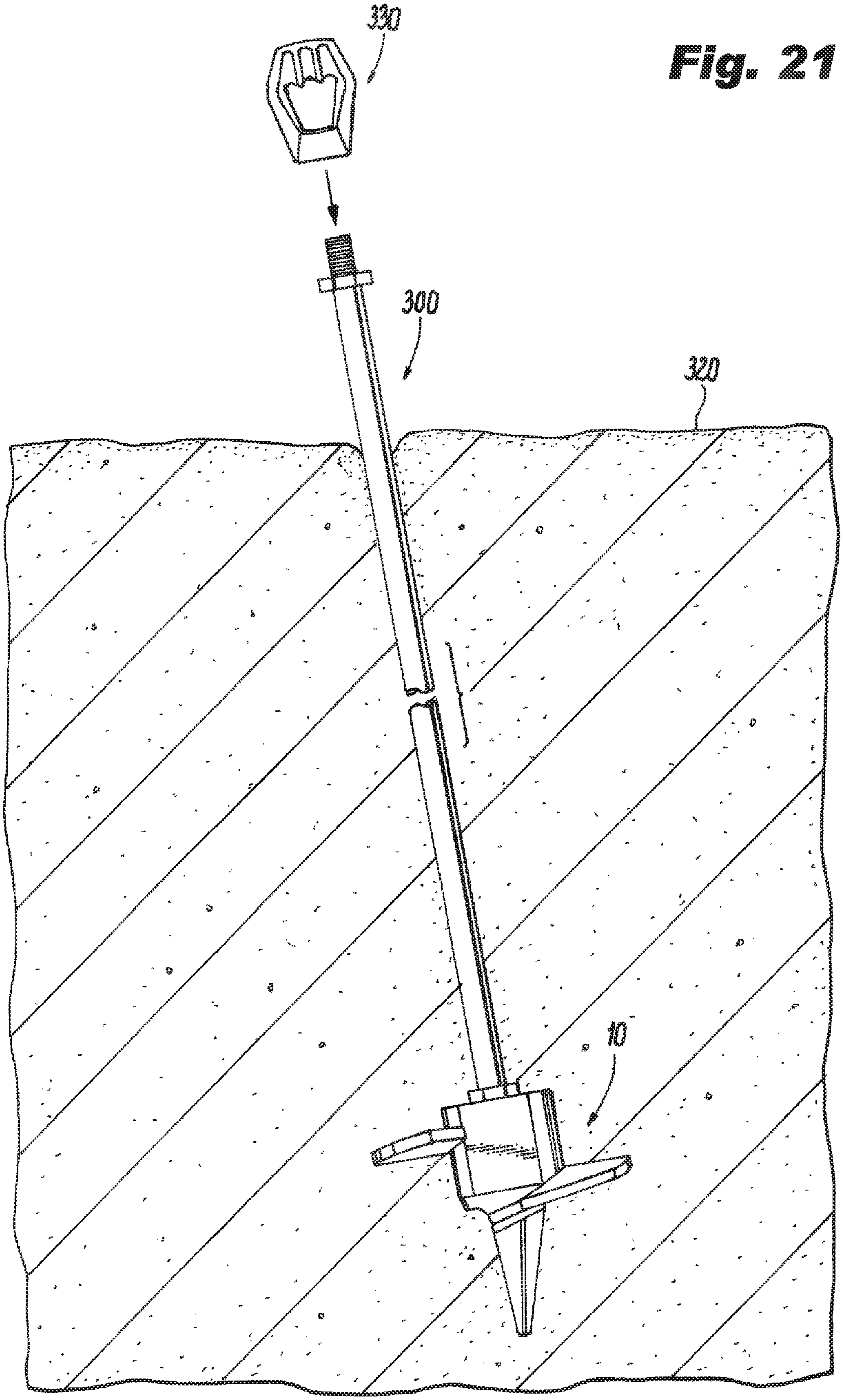
FIG. 21 is a side elevation view of exemplary final steps of the method for installing the anchor and anchor rod of FIG. 5 into the ground, illustrating the drive wrench removed from the ground leaving the anchor rod and anchor in the ground, and illustrating an eyelet attached to the end of the anchor rod extending above the ground.

Referring now to FIGS. 5 and 19-21, an exemplary method for installing the screw anchors according to the present disclosure will be described. In this exemplary method, the screw anchor used includes the anchor 10 of FIG. 1 and the anchor rod 300 of FIG. 5. However, any of the various embodiments of the anchor contemplated by the present disclosure may be substituted for the anchor 10 in the method. Initially, one end of an anchor rod 300 is attached to the nipple portion 42 of the power point 40, seen in FIG. 4. In one embodiment, the ends of the anchor rod 300 are threaded so that one end of the anchor rod 300 is threaded into the bore 50 of the rod coupler 46 to attach the anchor rod 300 to the anchor 10. A drive wrench 80 is positioned over the anchor rod 300 and slid into the opening 30 of the wrench hub 20, seen in FIGS. 5 and 19. A known pile drive system 310, seen in FIG. 19, is attached to the free end of the drive wrench 80. The drive wrench 80 and anchor 10 are positioned at an approximate angle of, for example, 45 degrees relative to the ground 320 and the pile drive system 310 is activated to rotate and drive the anchor 10 and anchor rod 300 into the ground. When the anchor rod 300 extends above the ground 320 a desired distance, the drive wrench 80 is removed from the soil, seen in FIG. 20, leaving the anchor 10 and anchor rod 300 in the ground, seen in FIG. 21. If the anchor 10 and anchor rod 300 are to be used to anchor a guy wire, an eyelet 330, seen in FIG. 21, may be attached to the threaded end of the anchor rod 300 extending above the ground.

As noted above, the pile drive system 310 is used to rotate the drive wrench 80 which in turn rotates the anchor 10 driving the anchor 10 and the anchor rod 300 into the soil 320. To withstand sufficient torque to drive the anchor 10 and the anchor rod 300 into the soil 320, the drive wrench 80 is configured and dimensioned to fit within the central opening 30 of the wrench hub 20 via the top end **20*a* of the wrench bub 20. In the embodiment shown in FIGS. 6-8, the wrench hub 20 has four hub walls, e.g., side walls 22, 24, 26 and 28, and four hub corners, e.g., rounded corners 22*a*, 24*a*, 26*a* and 28*a*. Similarly, the drive wrench 80 has four drive wrench walls, e.g., side walls 82, 84, 86 and 88 and four rounded drive wrench corners, e.g., corners 82*a*, 84*a*, 86*a* and 88*a*. The drive wrench walls and corners conform to respective hub walls and corners, such that when the drive wrench 80 is rotated the outside surfaces of the drive wrench walls and/or the drive wrench corners engage the inside surfaces of the hub walls and/or the hub corners. In addition, when the drive wrench 80 is rotated the torque ribs 48 extending from the rod coupler 46 engage the inside walls of the drive wrench corners and/or the drive wrench walls. This combination engagement of the drive wrench 80 with the hub walls and/or corners and the torque ribs 48 with the drive wrench walls and/or drive wrench corners increases the surface area contact between the wrench hub, e.g., wrench hub 20, and the drive wrench 80 allowing the anchor 10 to withstand greater torque when driving the anchor, e.g., anchor 10, and the anchor rod 300 into the ground. The torque that the anchors according to the present disclosure can withstand is related to a number of factors, including the material the anchor 10 is made of and the surface area of the contact points between the wrench hub, e.g., the wrench hub 20 and 220, and the wrench drive 80. To provide an exemplary perspective of the greater torque values, conventional screw anchors are rated to withstand about 15,000 ft/lbs of torque. The anchors according to the present disclosure with the two torque ribs 48 can withstand a 10-40 percent increase in torque or approximately 16,500-21,000 ft/lbs of torque. The anchors with the four torque ribs 48 according to the present disclosure can withstand, for example, a 44 percent increase in torque or approximately 21600 ft/lbs of torque. Thus, having the torque ribs 48 engage the inside surface of the drive wrench walls and/or corners increases the torque strength of the anchor 10 permitting the anchor to resist or withstand greater torque. The anchors with the hexagon shape wrench hub 220** according to the present disclosure can withstand, for example, a 44 percent increase in torque or approximately 21600 ft/lbs of torque.

The anchors according to the present disclosure permit the anchor to withstand greater torque than conventional screw anchors that is applied when driving the anchor and anchor rod into the ground. This allows the anchor to be installed in a variety of soil conditions to the desired depth. The screw anchor kits according to the present disclosure include an anchor and an anchor rod. The screw anchor kits according to the present disclosure may also include a wrench drive and/or an eyelet.

It will be understood that various modifications can be made to the configurations of the present disclosure herein without departing from the spirit and scope thereof. Therefore, the above description should not be construed as limiting the disclosure, but merely as embodiments or configurations thereof. Those skilled in the art will envision other modifications within the scope and spirit of the invention as defined by the claims appended hereto.

What is claimed is:

1. A screw anchor kit comprising:

a hollow drive wrench having at least one rounded outside corner and an inside surface comprising at least one rounded inside corner and at least one sidewall, and an anchor comprising, a wrench hub having a plurality of side walls defining a center opening, at least one inside corner having a first radius and each at least one inside corner configured to receive the at least one rounded outside corner of the hollow drive wrench;

a power point having a lead point portion and a nipple portion, the lead point portion having a base and a tip, the nipple portion extends from the base in a direction away from the tip, the nipple portion includes a rod coupler having a bore for receiving a rod anchor and at least one convex torque rib having a second radius different than the first radius and extending along an outer surface of the rod coupler from the base in the direction away from the tip for only a portion of a longitudinal length of the rod coupler and toward the at least one inside corner of the wrench hub, the at least one convex torque rib configured to contact and engage the inside surface of the at least one rounded inside corner of the hollow drive wrench and at least a portion of the inside surface of the at least one sidewall of the hollow drive wrench, wherein a distance between the at least one inside corner of the wrench hub and the at least one convex torque rib is configured to receive a thickness of the hollow drive wrench, and wherein the base of the lead point portion is attached to a first end of the wrench hub and wherein portions of the rod coupler between the at least one convex torque rib are convex and do not engage the inside surface of the hollow drive wrench; and a load plate attached at least to the wrench hub.

2. The screw anchor kit according to claim 1, wherein the plurality of wrench hub side walls comprises four side walls shaped as a square, and wherein a plurality of nipple portion side walls comprises four side walls shaped as a square.

3. The screw anchor kit according to claim 1, wherein the plurality of wrench hub side walls comprises six side walls shaped as a hexagon, and wherein a plurality of nipple portion side walls comprises six side walls shaped as a hexagon.

4. The screw anchor kit according to claim 1, wherein the load plate comprises a helical plate.

5. The screw anchor kit according to claim 1, wherein the at least one convex torque ribs are triangular shaped to engage with the at least one rounded inside corner of the hollow drive wrench.

6. A screw anchor kit comprising:

a hollow drive wrench having multiple side walls defining a center opening and having at least one rounded outside corner and an inside surface comprising at least one rounded inside corner and at least one sidewall, and an anchor comprising:

an anchor rod;

a wrench hub having multiple side walls defining a center opening, at least one inside corner having a first radius, the at least one inside corner of the wrench hub configured to receive the at least one rounded outside corner of the hollow drive wrench;

a power point having a lead point portion and a nipple portion, the lead point portion having a base and a tip, the nipple portion extends from the base in a direction away from the tip, the nipple portion includes a rod coupler having a bore for receiving and securing the anchor rod and at least one convex torque rib having a second radius different than the first radius and extending along an outer surface of the rod coupler from the base in the direction away from the tip for only a portion of a longitudinal length of the rod coupler and toward the at least one inside corner of the wrench hub, the at least one convex torque rib configured to contact and engage the inside surface of the at least one rounded inside corner of the hollow drive wrench and at least a portion of the inside surface of the at least one sidewall of the hollow drive wrench, wherein a distance between the at least one inside corner of the wrench hub and the at least one convex torque rib is configured to receive a thickness of the hollow drive wrench, and wherein the base of the lead point portion is attached to a first end of the wrench hub and wherein portions of the rod coupler between the at least one convex torque rib are convex and do not engage the inside surface of the hollow drive wrench; and a load plate attached at least to the wrench hub.

7. The screw anchor kit according to claim 6, the hollow drive wrench further comprising four side walls and shaped as a square.

8. The screw anchor kit according to claim 6, further comprising an eyelet.

9. The screw anchor kit according to claim 6, wherein the wrench hub has four side walls and is shaped as a square.

10. The screw anchor kit according to claim 6, wherein the wrench hub has six side walls and is shaped as a hexagon.

11. The screw anchor kit according to claim 6, wherein the at least one convex torque rib comprises two convex torque ribs extending along the outer surface of the rod coupler.

12. The screw anchor kit according to claim 11, wherein the two convex torque ribs are spaced apart about 180 degrees along the outer surface of the rod coupler.

13. The screw anchor kit according to claim 6, wherein the at least one convex torque rib comprises four convex torque ribs extending along the outer surface of the rod coupler.

14. The screw anchor kit according to claim 13, wherein the four convex torque ribs are spaced apart about 90 degrees along the outer surface of the rod coupler.

15. The screw anchor kit according to claim 6, wherein the load plate comprises a helical plate.

16. The screw anchor kit according to claim 6, wherein the at least one convex torque ribs are triangular shaped to engage with the at least one rounded inside corner of the hollow drive wrench.

* * * * *